United States Patent [19]
Tilley

[11] 4,179,017
[45] Dec. 18, 1979

[54] BALE TURNER

[76] Inventor: Martin C. Tilley, 683 Eastland Dr. S., Twin Falls, Id. 83301

[21] Appl. No.: 893,008

[22] Filed: Apr. 3, 1978

[51] Int. Cl.² .............................................. B65G 11/00
[52] U.S. Cl. ................................. 193/47; 100/188 R; 414/770; 414/774 R
[58] Field of Search ............................ 193/44, 47, 46; 100/188 R, 188 BT; 414/769, 770, 774

[56] References Cited

U.S. PATENT DOCUMENTS

| 2,461,290 | 2/1949 | Maynard et al. | 193/47 X |
| 2,724,476 | 11/1955 | Steptoe | 193/47 X |
| 3,161,008 | 12/1964 | Shepley et al. | 193/47 |

Primary Examiner—Joseph F. Peters, Jr.
Assistant Examiner—D. W. Underwood

[57] ABSTRACT

A bale turner for attachment to a bale making machine for rotating bales one quarter turn containing a concave plate suspended between two frame members following behind the discharge chute of the hay baler. A guide bar is welded to the concave plate which forces the edge of the bale down into the center of the concave plate as the bale travels down the plate from the discharge chute of the hay baler. This in effect starts to set the bale on edge so that it would rotate back onto the plate chamber side down.

5 Claims, 4 Drawing Figures

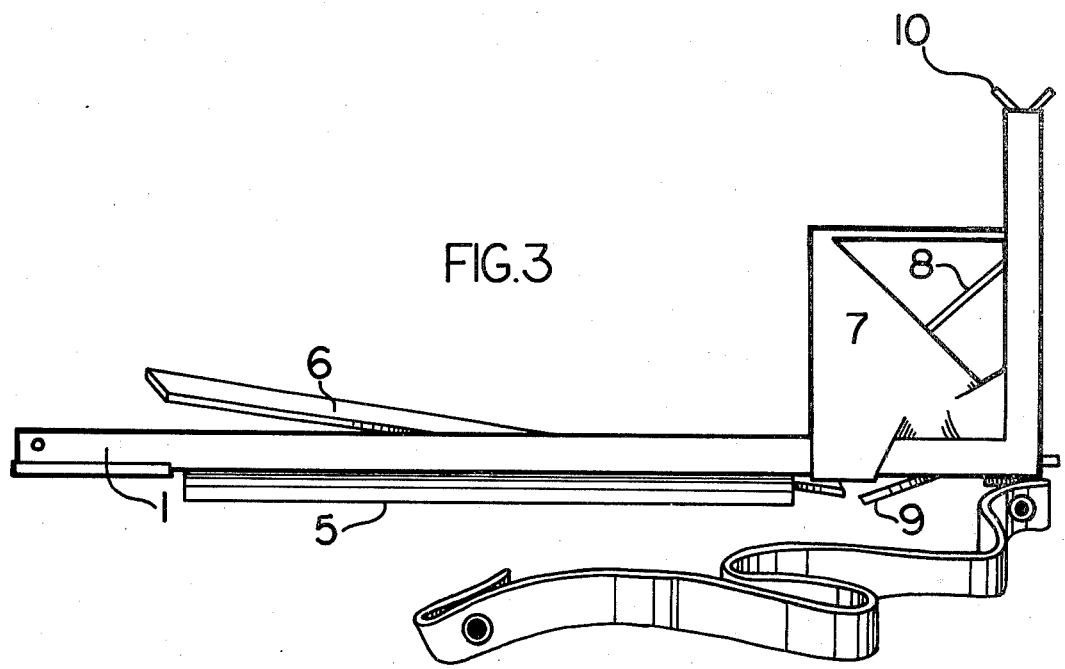
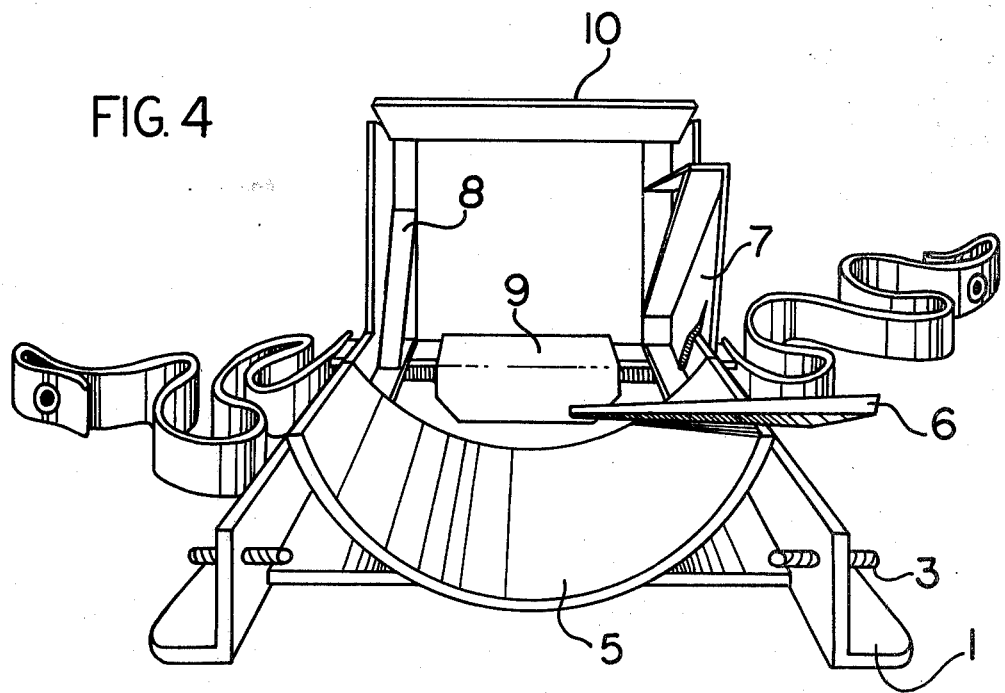

BALE TURNER

FIELD OF INVENTION

This invention relates to a means for rotating bales of hay as they exit an automatic bale maker so that all of the bales are deposited in the field in such manner that an automatic haystacker can retrieve them from the field and stack them with maximum efficiency.

BACKGROUND OF THE INVENTION

Mankind has, for at least since the beginning of recorded history, been raising and storing hay and other animal feeds for wintertime use. Throughout the ages this has been accomplished without the aid of farm machinery. With the introduction, around the turn of the century, of power-driven farm machinery, significant changes in the method in which hay is stored have been made.

An early development in agricultural engineering was the automatic hay baler. While there have been numerous and important design changes throughout the years that automatic hay balers have been used, the basic principles have remaned the same. The field of hay to be baled is first cut by a machine commonly known as a swather and collected in rows, called windrows, behind the swather. The hay is left in the windrows, exposed to the sun and wind and left to dry.

The hay baler, usually towed behind a tractor, is then guided down the windrows of hay, where it scoops up the hay in the windrow, conveys it into the baler where a piston, press or similar apparatus packs it into a chamber. As the piston works, an attached cutting edge shears the hay to form one side of the bale. When the bale reaches a predetermined size, the hay baler automatically wraps the bale with twine or wire and the wrapped bale is transferred to the rear of the hay baler where it is dropped onto the field for later retrieval.

By the very nature of the hay baling process the hay bale is created which has four distinct sides. Two of the sides of the bale, called the string sides, are the sides which are wrapped with the twine, and are similar with the strands of hay laying in a relatively uniform parallel pattern at a 90° angle to the strands of wire which hold the bale together. Another of the sides is called the cut side and is that side which was sheared by the cutter in the automatic hay baler. The fourth side is the chamber side and is that which was up against the rear wall packing chamber of the automatic hay baler. In practice it has been found that there is a distinct difference between the cut side and the chamber side of the hay bale. The cut side has a much more uniform configuration of blades and strands of hay. The chamber side of the bale has blades and strands of hay compressed together in numerous and various directions, is not nearly as regular as the sheared end, and can withstand more compression without distortion.

Prior to the development of automatic retrieval systems for hay bales, the common practice, which is still widely used today, was for laborers to manually pick up the bales from the field and toss them onto a wagon where a second laborer would stack the hay. Once the hay wagon was fully stacked, it would be towed to the storage facility or a location where the laborers would manually unload the bales, stacking them for storage. In practice it was best to pick up the bales by the baling wires and to stack them cut side up since this placed the chamber side down. The chamber side being more randomly packed, provided a firmer base for the bale, hence allowed stacking more bales higher.

As long as the hay bales were retrieved manually, it was of little importance which way the bale was deposited on the ground by the automatic bale maker. In fact, most bales were deposited string side up, which was the most convenient position for the laborers to retrieve the bale from.

A second feature common to nearly all hay balers is that they are designed to be positioned behind the tractor in such a manner that the windrow hay pick-up portion of the baler is displaced to the right of the tractor. The reason for this is that it allows the farmer, when he reaches the end of a windrow, to turn to his right to travel up another windrow without driving his tractor across the windrow. As a result, farmers have traditionally used a method of baling hay which requires the farmer to alternate the windows as he moves up and down the field. The direction of travel is similar to a looping action where the farmer enters the field at the head of the windrows, skips the first windrow and moves his hay baler down the second windrow, turning to his right at the end and travels up the first windrow, turns to his right again skipping the third windrow, moving down to the fourth windrow then turning right again traveling up the third windrow, then turning right at the head of the field and skipping the fifth windrow and moving down the sixth one, and so forth. If the farmer did not use this alternating, looping method of travel, he would be required to turn right at the head of the field and left at the bottom.

A third feature common to nearly all hay balers, and this is created by the basic design of hay baler, is that the bale of hay exits the hay baler at a position laterally displaced from the windrow. In practice the hay balers currently in use displace the hay bale approximately three to four feet to the left of the windrow.

As a result of the combination of the lateral displacement of the bale to the left and the farmer's looping action to the right, is that a double row of bales is created.

When hay was manually removed from the field, there was a significant advantage to this double row since all of the bales were string side up, and there were two rows of bales closely spaced together.

Additionally, as long as the farmer's tractor was not too large, there would be room for the tractor to make the upfield windrow run between the bales of hay on his left and the windrow on his right.

This doublerow of string side up bales did not pose many significant problems during the early stages of development of automatic bale retriever systems. The first bale retrievers were merely motorized ramps which lifted the bale off the field and conveyed it up to a platform where it was still manually stacked by the laborer. For this type of operation it was still advantageous to leave the bales in the field string side up, since the transverse strands of hay were easily caught by a cog in a chain pick-up device and when the bale reached the end of the motorized ramp the strings were easily accessible to the laborer for picking up the bale and stacking it.

With the development of automatic retrieval and bale stacking devices, the position of the bale in the field has become significantly more important. There are numerous reasons for this, the first and foremost of which is that it is most desirable to stack the bales cut side up. If a bale lays in the field string side up, the automatic retriever and stacker must reposition the bale prior to stacking it.

A second reason is that there is a distinct difference in the strength with which the bale wires hold the bale together between the cut side and the chamber side of the bale. The string closest to the chamber side compresses the hay uniformly since that is the area of the bale where the blades of hay are most randomly mixed. The cut side string, while having the same compression as the chamber side string, is holding that portion of the bale which is far more uniformly layered. Additionally, the cut side has a tendency to have the strands of hay uniformly canted off in one direction near the cut side edge of the bale, which is caused by the action of the automatic bale cutter. For that reason the string on the cut side of the bale has a tendency to be more easily pulled off of the bale.

This presents significant problems to automatic retrieval and stacking systems. If the bale is lying cut side down the retrieval system must operate at a slower rate of speed so as to not pull or distort the bale to the point where the cut side string will pull off. To prevent this, the automatic retrieval systems are operated at a lower rate, hence, slowing down the entire operation of retrieval and stacking.

The most advantageous way of method to retrieve the bales is to have them all positioned uniformly cut side up so that the retriever can operate at maximum efficiency and the stacker does not have to manipulate or turn the bale prior to placing it in the stack.

DESCRIPTION OF PRIOR ART

The traditional method of insuring that each bale is positioned properly has been to have someone walk through the field behind the hay baler turning and adjusting the bales so that they are in a parallel line, end to end, with the cut sides up, the chamber side down. Numerous mechanical devices have been developed during the past several years to automate this positioning; however, none of them have worked satisfactorily for a number of reasons.

The most common device used to position the bale as it exits the hay baler is best described as a tapered ramp onto which the bale is pushed from the hay baler. When the hay bale reaches the end of the ramp, it falls sideways off of it, rotating a quarter turn as it falls to the ground. In effect, the bale is flipped over a quarter turn rather than turned a quarter turn. Dampers are in common usage with these bale flippers to slow the rate of turn and hopefully protect the bale from breakup upon impact with the ground.

These bale flippers do not work satisfactorily for two reasons. The first reason is that the bale makes a dead fall of some two to three feet and sometimes breaks upon impact with the ground, or loses the cut side string.

A second, and more important, reason is that the bale, when it is flipped off the side of the ramp, is laterally displaced an additional seven to twelve inches to the left when it hits the ground. In a typical hay baler-tractor configuration, where the operator is looping the windrows to the right with the hay baler offset to the right of the tractor, flipping the bales an additional seven to twelve inches to the left on the downfield baling run will result in insufficient space for the corresponding upfield baling run, thus requiring the operator to drive his tractor on the windrow in order to avoid the bales to his left. In such cases, and if the design of the baler is such that flipping the bale to the righr results in depositing the bale on the ground cut side down, then the automatic retrieval system will have to be operated at a slower speed.

To partially compensate for this problem, the bale flippers in common usage today are usually designed to be reversed for the downfield run, flipping the bale seven to twelve inches laterally to the right, hence cut side down, and then reversed, flipping the bales to the left for the upfield run. While the bale flipper does accomplish one purpose, that is to avoid leaving the bales string side up, the result if the bale flipper is alternated flipping to the right and to the left is that every other row of bales is cut side down.

OBJECTS OF THE INVENTION

Accordingly it is an object of this invention to turn the bales one quarter turn as they exit the hay baler, and deposit them on the ground cut side without moving them laterally.

A second object of this invention is to deposit all of the bales cut side up in straight, end to end rows.

And a third object of this invention is to deposit them on the ground end first to minimize the length of freefall, with the resulting bounce, possible overturning of the bales or the loss of the cut side up string.

SUMMARY OF THE INVENTION

These objects are accomplished by this invention by the fact that the bale is not flipped off of a ramp, but rather rotated 90° around its longitudinal axis as it exits the discharge of the hay baler and is deposited end first on the ground directly behind the point where it exited the hay baler.

This is accomplished by means of a concave plate suspended between two frame members following behind the discharge chute of the hay baler. A guide bar is welded to the concave plate which forces the edge of the bale down into the center of the concave plate as the bale travels down the plate from the discharge chute of the hay baler. This in effect starts to set the bale on edge so that it would rotate back onto the plate chamber side down.

As the hay bale is set on edge to fall chamber side down it contacts two additional guides, one which urges the other edge of the chamber side in a downward direction and another which urges the edge diagonally across from the second chamber side edge in an upward direction, thus forcing the bale to complete the quarter turn so that its chamber side is down. As soon as this has been accomplished, the bale, as it continues to travel down the bale turner, contacts a fourth guide means which is in effect a roller or ramp which allows the bale to exit the frame end first where it falls a shorter distance to the ground, thus minimizing impact forces.

BRIEF DESCRIPTION OF THE ACCOMPANYING DRAWINGS

FIG. 1 is a perspective view of the bale turner.
FIG. 2 is a second perspective view.
FIG. 3 is a side view.
FIG. 4 is a frontal perspective view.

DETAILED DESCRIPTION OF PREFERRED EMBODIMENTS

Figure 1:
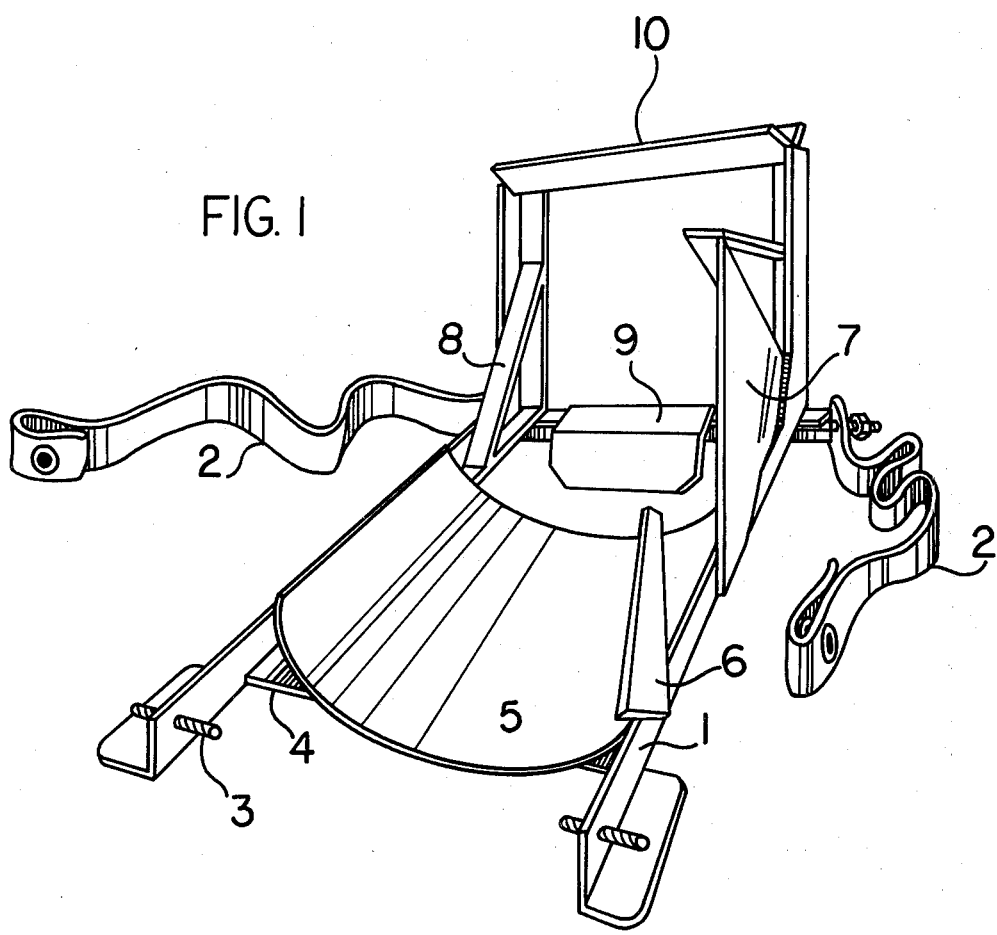

FIGS. 1, 3 and 4 show to advantage the features of this invention in one of the preferred embodiments. All of the various guide means are attached to framework 1, which in turn is connected to the hay baler by connecting pins 3. Support straps 2 are provided to support the bale turner at the desired rearward elevation. In practice it has been found that the most advantageous positioning of the bale turner is to have framework 1 in a substantially horizontal plane to the discharge chute of the hay baler supported by straps 2 so that framework 1 slopes downwardly toward the rear. In this position the bale to be turned will move at a more uniform rate of speed, through the bale turner and will have less of a free-fall off the end of the bale turner.

Figure 2:
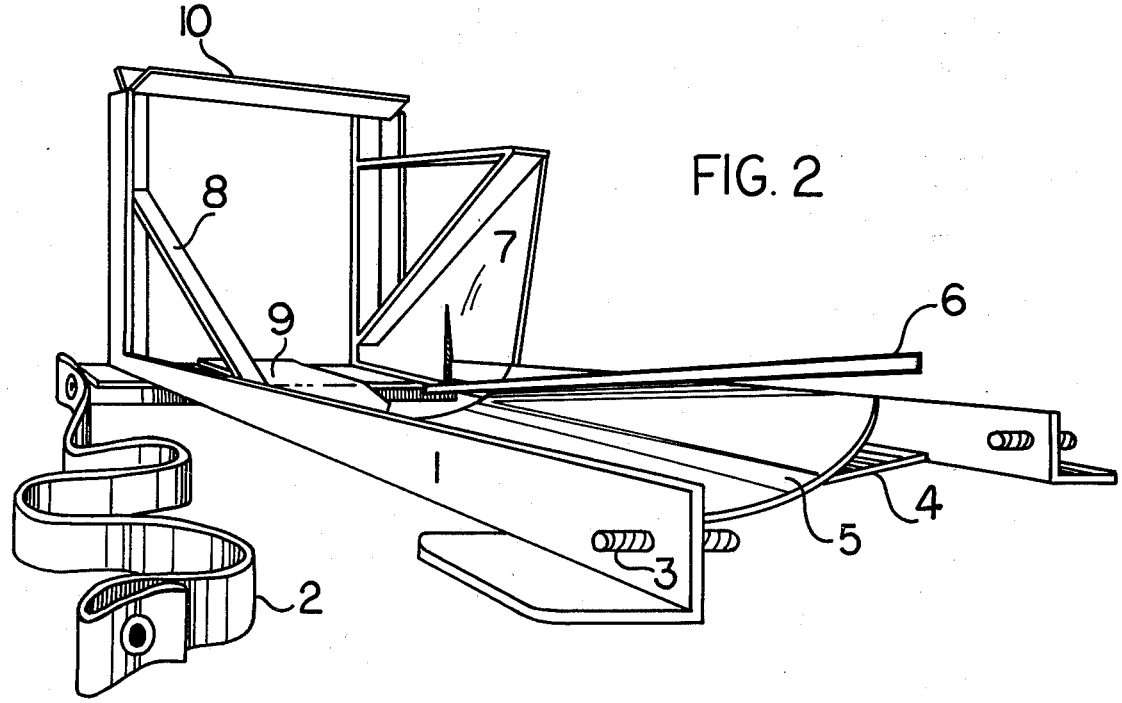

The bale exits the hay baler end first with one of its string sides up. And looking down through the bale turner in FIGS. 1, 2 and 4, its chamber side will be on the right hand side of the bale. The bale is received into the bale turner onto receiving platform 5. Platform 5 is a concave plate with a first guide bar 6 welded to it.

For the sake of simplicity I will refer to the edge of the bale at the lower right hand corner as the bale exits the hay baler as an old bottom edge and the edge of the bale in the upper right hand corner as the bale exits the baler as the new turned bottom edge since, after accomplishing the bale turning it will be a bottom edge. As the bale begins to drop onto platform 5 the old bottom edge contacts first guide means 6 and is forced down into the concave bottom of platform 5.

This movement causes the bale to be displaced to the left of platform 5 and canted to the right in a rotation-like movement pivoting about the longitudinal axis of the bale. As the bale travels further down the bale turner the new turned bottom edge engages guide plate 7 and is forced in a downward direction.

At the same time the second old bottom edge which is now the new turned top edge has been rotated up and engages the new top edge guide 8 and is thusly forced in an upward direction. The net result of the bale engaging guide plate 7 and new top edge guide 8 is further rotational movement around its longitudinal axis to complete the 90° turn of the bale.

As soon as the bale has completed its 90° turn, it contacts drop-off guide 9 and passes through the opening defined by framework 1 and cross member 10. Drop-off guide 9 and the rear opening defined by framework 1 and cross member 10 are designed to steady the bale, and prevent it from further rotation. Additionally, cross member 10 is positioned at a height that fixes a maximum predetermined angle on the bale as it drops edge first off of drop-off guide 9. By so positioning the angle of the bale as it drops off the bale turner, we insure that each bale drops at a uniform rate and in essentially the same direction off the bale turner.

In practice it has been found advantageous to use a roller in lieu of top edge guide 8. Additionally, it has been found that rollers can be used in lieu of or in conjunction with new bottom edge guide 7.

Having thus described in detail the preferred designs which embody the concepts and principles of the invention and which accomplish the various objects, purposes and aims thereof, it is to be appreciated and will be apparent to those skilled in the art that many physical changes could be made in this invention without altering the inventive concepts and principles embodied therein. Hence, it is intended that the scope of this invention be limited only to the extent indicated in the appended claims.

I claim:

1. A bale turner for attachment to a bale making machine comprising:
    (a) a first frame defining a rectangular space removably attached to a bale making machine and disposed in a downwardly sloping horizontal plane away from said bale making machine;
    (b) a second frame disposed in a vertical plane attached to the first frame at its lower end, said second frame defining a space through which turned bales exit the bale turner;
    (c) a concave platform attached to the first frame for receiving end first the bale to be turned;
    (d) first guide means attached to said platform for rotating the turned bottom edge of the bale downwardly into said concave platform thereby partially rotating said bale around its longitudinal axis;
    (e) second guide means disposed between and attached to the first and second frames for urging the new turned bottom edge of the bale in a downwardly direction;
    (f) third guide means attached to the first and second frames and positioned on the first frame opposite the second guide means for urging the new turned top edge of the bale in an upward direction; and
    (g) fourth guide means for urging the turned bale through the space defined by the second frame and off the bale turner without further rotation.

2. The bale turner of claim 1 wherein said first guide means comprises a bar.

3. The bale turner of claim 1 wherein said second guide means comprises a roller.

4. The bale turner of claim 1 wherein said third guide means comprises a roller .

5. The bale turner of claim 1 wherein said fourth guide means comprises a roller.

* * * * *